(12) United States Patent
Nandy et al.

(10) Patent No.: US 10,742,431 B2
(45) Date of Patent: Aug. 11, 2020

(54) CENTRALIZED DATABASE BASED MULTICAST CONVERGING

(71) Applicant: Hewlett Packard Enterprise Development LP, Houston, TX (US)

(72) Inventors: Tathagata Nandy, Bangalore (IN); Chethan Chavadibagilu Radhakrishnabhat, Bangalore (IN); Balaji Sankaran, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 113 days.

(21) Appl. No.: 16/118,833

(22) Filed: Aug. 31, 2018

(65) Prior Publication Data
US 2019/0068387 A1 Feb. 28, 2019

(30) Foreign Application Priority Data

Aug. 31, 2017 (IN) .............................. 201741030935

(51) Int. Cl.
*H04L 12/18* (2006.01)
*G06F 16/27* (2019.01)
*G06F 16/25* (2019.01)

(52) U.S. Cl.
CPC ............ *H04L 12/18* (2013.01); *G06F 16/252* (2019.01); *G06F 16/27* (2019.01); *H04L 12/1881* (2013.01)

(58) Field of Classification Search
CPC ... H04L 12/18; H04L 12/1881; G06F 16/252; G06F 16/27
See application file for complete search history.

(56) References Cited

U.S. PATENT DOCUMENTS

| | | | |
|---|---|---|---|
| 8,102,848 B1 | 1/2012 | Rao | |
| 9,276,756 B2 | 3/2016 | Dholakia et al. | |
| 9,288,105 B2 | 3/2016 | Anumala et al. | |
| 9,699,029 B2 | 7/2017 | Guntaka et al. | |
| 2003/0067924 A1 | 4/2003 | Choe et al. | |
| 2006/0236032 A1* | 10/2006 | Campbell | G06F 12/0866 711/118 |
| 2007/0064695 A1* | 3/2007 | Song | H04L 12/18 370/390 |

(Continued)

OTHER PUBLICATIONS

Behringer et al., "RFC 7404—Using Only Link-Local Addressing inside an IPv6 Network", Nov. 2014, pp. 1-11.

(Continued)

*Primary Examiner* — Will W Lin
(74) *Attorney, Agent, or Firm* — Brooks, Cameron & Huebsch, PLLC

(57) ABSTRACT

Examples herein are directed to centralized database based multicast converging. For instance, in various examples centralized database based multicast converging can include starting a restart timer having a value greater than a time to validate stored entries in a centralized database, sending data packets at least to hosts on the network corresponding to the stored entries in the centralized database to maintain service to the hosts while the restart timer is running, sending query packets to validate a host corresponding to an entry of the stored entries in the centralized database, and responsive to the restart timer expiring, sending data packets to a converged group of hosts including at least the validated host.

20 Claims, 6 Drawing Sheets

(56) References Cited

U.S. PATENT DOCUMENTS

| | | | |
|---|---|---|---|
| 2010/0014519 A1* | 1/2010 | Fernandez Gutierrez ................... | H04L 12/185 370/390 |
| 2013/0182707 A1* | 7/2013 | Angst ................. | H04L 12/4625 370/390 |
| 2013/0250950 A1* | 9/2013 | Singh ................... | H04L 12/185 370/390 |
| 2015/0341183 A1* | 11/2015 | Song ................. | H04L 12/1886 370/390 |
| 2018/0248803 A1* | 8/2018 | Nagarajan ............... | H04L 47/18 |

OTHER PUBLICATIONS

Cain et al., "RFC 3376—Internet Group Management Protocol, Version 3," Oct. 2002, pp. 1-53.
W. Fenner, "RFC 2236—Internet Group Management Protocol, Version 2", Nov. 1997, pp. 1-24.
Unknown, "Multi-Chassis Synchronization for IGMP Snooping", www.infoproducts.alcatel-lucent.com, May 22, 2014, 11 Pages.

* cited by examiner

CENTRALIZED DATABASE BASED MULTICAST CONVERGING

PRIORITY INFORMATION

This application claims priority to India Application No. 201741030935, filed on Aug. 31, 2017. The contents of which are incorporated herein by reference in its entirety.

BACKGROUND

Multicast technology can provide content over a network. Multicast technology is a mechanism for transmitting data from a single source (for example, a server) to multiple receivers (for example, personal computers) on a network. Multicast packets are replicated down appropriate paths in a network to create an efficient routing mechanism. The sender may send a data packet once, even if the packet is to be delivered to multiple receivers.

DETAILED DESCRIPTION

Figure 1:
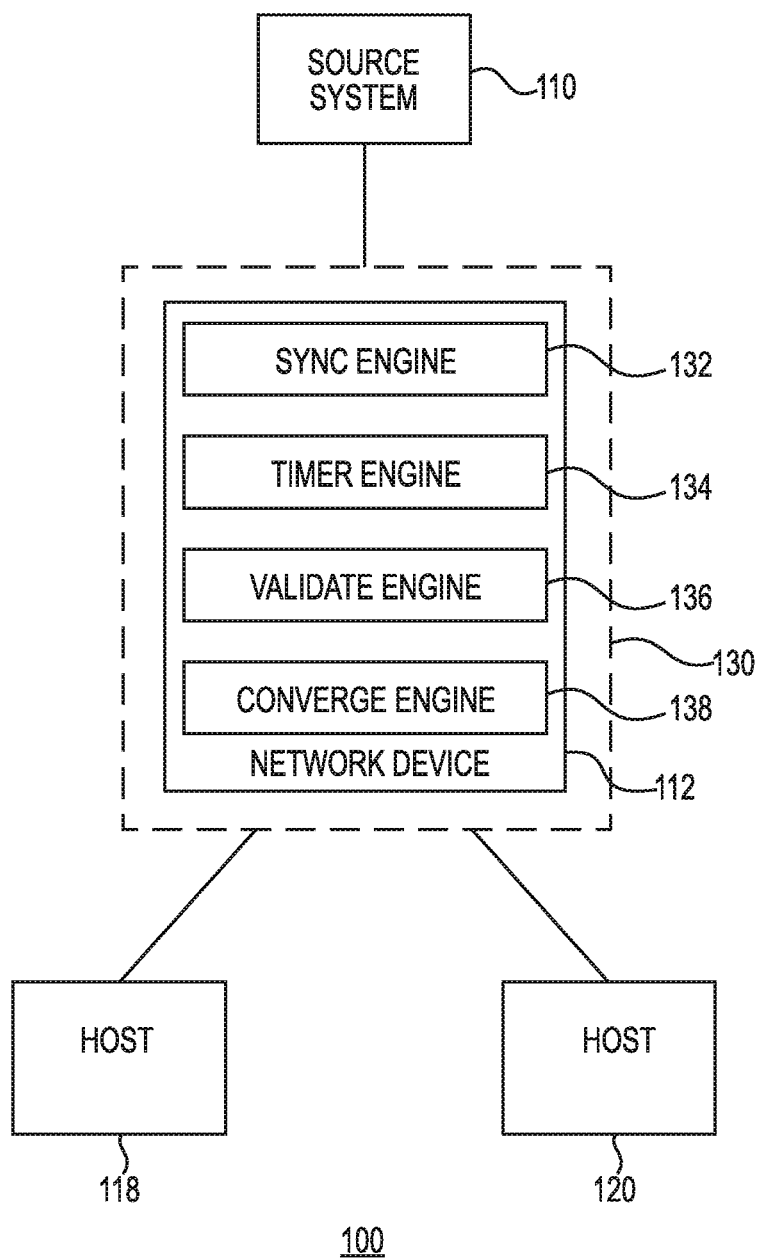
FIG. 1 is a block diagram of an example of a computing environment suitable with centralized database based multicast converging according to the disclosure.

Multicast technology may be used by organizations to send data (especially, multimedia content) over a network. Multicast technology may allow host computer systems, who have subscribed to a particular content data flow of a content server, to receive the content. Host systems may signify their willingness to receive a particular data from a content server by joining a particular multicast group. Once host systems join a particular group, a multicast distribution tree may be created for that group. The flow of data from a multicast source system to receiver devices may be managed by a multicast protocol. Some non-limiting examples of protocols that may be used to manage flow of data in a multicast system may include Internet Group Management Protocol (IGMP), Multicast Listener Discovery (MLD) protocol, Protocol Independent Multicast (PIM), and Distance Vector Multicast Routing Protocol (DVMRP).

IGMP is an Internet protocol that may be used by IPv4 systems (hosts and routers) to report their IP multicast group memberships to any neighboring multicast routers. The protocol may be used between end systems (hosts) and a multicast router to request data for a given multicast group.

PIM is a family of multicast routing protocols for Internet Protocol (IP) networks that provide one-to-many and many-to-many distribution of data over a network. PIM is not dependent on a specific unicast routing protocol; it can make use of any unicast routing protocol in use on the network.

Multicast network deployments may involve configuration of various multicast protocols like IGMP, MLD, PIM, MSDP, etc. These protocols in turn have hundreds of configurable parameters that are to be configured for efficient multicast forwarding in a network.

Managing these protocols and effectively configuring these parameters is a technically challenging task, particularly during a failover. That is, in a communications network, a path between a transmitter and a destination may involve several intermediate routers and switches that convey data packets and other information through the network to the destination. On occasion, one or more of these routers or switches may fail to move the packets and other data towards the destination. In situations in which the router fails to transport any data packets, existing network management products can be used to detect the faulty element and to reroute data packets around the failed element.

For example, in some approaches, should a master management card in a router/switch fail, multicast protocol handling can be taken up by a standby management card in the router/switch. In such approaches, the standby (now new master) management card can initiate a delay timer when it becomes master. The new master will transmit IGMP and/or PIM hello messages on the routers ports, and begin relearning the multicast state that was lost when the previous master failed. At the expiration of the delay timer, the new master may loads the new forwarding tables that it has built during the learning phase down to the line cards, which replace the forwarding table CAM entries with the new entries. However, such approaches may inherently impart an unwanted delay (e.g., before permitting traffic to newly joined hosts) associated with awaiting expiration of the delay timer and/or learning each of the neighbors during the learning phase prior to loading the new forwarding table built during the learning phase down to the line cards.

Accordingly, the present disclosure describes various examples for centralized database based multicast converging on a network. In an example, centralized database based multicast converging can include starting a restart timer having a value greater than a time to validate stored entries in a centralized database, sending data packets at least to hosts on the network corresponding to the stored entries in the centralized database to maintain service to the hosts while the restart timer is running, sending query packets to validate a host corresponding to an entry of the stored entries in the centralized database, and responsive to the restart timer expiring, sending data packets to a converged group of hosts including at least the validated host.

Desirably, centralized database based multicast converging employing a centralized database such as an Open virtual Switch database (OVSDB) can mitigate or eliminate any delay for newly joined hosts as compared to other approaches and yet provides interrupted active multicast flows through a network device such as a switch and/or a router. Moreover, it is noted that centralized database based multicast converging can employ a zero touch configuration for multicast deployments where various network parameters may be determined by a network device (for example, a network switch), which may enable the network device to auto-configure a multicast protocol and the configuration parameters related thereto without user intervention. Further, the network parameters may be regularly monitored by the network device and configuration parameters related to a multicast protocol may be dynamically updated on the network device, specifically in the centralized databases (e.g., an OVSDB) on the network device.

FIG. 1 is a block diagram of an example of a computing environment 100 suitable with centralized database based multicast converging according to the disclosure. Computing environment 100 may represent a multicast network. As illustrated in FIG. 1, computing environment 100 may include a source system 110, a network device 112, and hosts 118 and 120. Although one source system, one network device, and two hosts are shown in FIG. 1, other examples consistent with this disclosure may include more than one source system, more than one network device, and more or less than two hosts.

Source system 110, network device 112, and hosts 118 and 120, may be communicatively coupled, for example, via a computer network 130. Such a computer network 130 may be a wireless or wired network. Such a computer network 130 may include, for example, a Local Area Network (LAN), a Wireless Local Area Network (WAN), a Metropolitan Area Network (MAN), a Storage Area Network (SAN), a Campus Area Network (CAN), or the like. Further, such a computer network 130 may be a public network (for example, the Internet) or a private network (for example, an intranet). In an example, computer network 130 may be an IPv4 or IPv6 network. In an example, computer network 130 may be used to transmit and route multicast content.

Source system 110 may be any type of computing device capable of reading machine-executable instructions. Examples of the computing device may include, without limitation, a server, a desktop computer, a notebook computer, a tablet computer, a thin client, a mobile device, a personal digital assistant (FDA), a phablet, and the like. In an example, source system 110 may host multicast content. Multicast content may include, for example, data, image, audio, video, multimedia, and other like content. Multicast content may be shared with hosts 118 and 120 (also known as multicast subscribers) through network device 112.

Network device 112 may include, for example, a router, a virtual router, a network switch, and a virtual switch. In an example, network device 112 may be a multicast router and/or a multicast switch. Network device 112 may be used to route multicast data from source system 110 to a host (for example, 118 and 120).

In various examples, network device 112 can be a first hop multicast converging device of the network. For instance, the network device 112 can be a first hop multicast converging device in the form of a switch and/or router such as switch and/or router than is capable of employing an OVSDB. The network device can be a switch enabled for IGMP, PIM protocol, and/or IGMP snooping, as described herein. In some examples, the network device 112 can be a router enabled for IGMP, PIM protocol, and/or IGMP snooping.

Hosts (i.e., client devices) 118 and 120 may each be any type of computing device that is capable of executing machine-readable instructions. Examples of the hosts may include, without limitation, a server, a desktop computer, a notebook computer, a tablet computer, a thin client, a mobile device, a personal digital assistant (FDA), a phablet, and the like. Hosts 118 and 120 may each include a client or multicast application for receiving multicast data from a source system (for example, source system 110).

Multicast technology may allow hosts (for example, 118 and 120), who may have subscribed to a particular content data flow of a source system (for example, 110), to receive content from the source system. Hosts (for example, 118 and 120) may signify their willingness to receive a particular data from a content server by joining a particular multicast group. Once hosts join a particular group, a multicast distribution tree may be created for that group. The flow of data from a multicast source system to receiver devices over network 130 may be managed by a multicast protocol. Examples of multicast protocol may include IGMP and PIM.

IGMP may be used between hosts (for example, 118 and 120) and a network device (for example, network device 112) to request data for a given multicast group. For instance, routers and/or switches may use IGMP group membership to build their multicast routing table.

In an example, network device 112 may include a sync engine 132, a timer engine 134, a validate engine 136, and a converge engine 138, among other possible engines. Engines 132, 134, 136, and 138 may each include any combination of hardware and programming to implement the functionalities of the engines described herein. In examples described herein, such combinations of hardware and software may be implemented in a number of different ways. For example, the programming for the engines may be processing resource executable instructions stored on at least one non-transitory machine-readable storage medium and the hardware for the engines may include at least one processing resource to execute those instructions. In some examples, the hardware may also include other electronic circuitry to at least partially implement at least one engine of network device 112. In some examples, the at least one machine-readable storage medium may store instructions that, when executed by the at least one processing resource, at least partially implement some or all engines of network device 112. In such examples, network device 112 may include the at least one machine-readable storage medium storing the instructions and the at least one processing resource to execute the instructions.

In an example, sync engine 132 on network device 112, which may be present in a multicast network (for example, 100), may store entries from an active centralized database in active management module (MM) to a standby centralized database in a standby MM. In this manner, the stored entries in the active centralized databased and those in the standby centralized database can be synced. Stated differently, the stored entries in the active centralized databased and those in the standby centralized database can be the same (prior to admission of any newly joining hosts and/or pruning of invalidate hosts). Such syncing of entries can occur responsive to an occurrence of an event such as a change (addition/removal) in a host device on the network, a change (additional/removal) of a network device such a router/switch, and/or a change in a source system (addition/removal) of a source system, among other possible events that may impact multicast routing. In some examples, information such as protocol stored in a stored in centralized database of a standby MM at a time of a failover are maintained but not used by the standby MM when the standby module becomes active to avoid flooding the network.

In an example, timer engine 132 may start a restart timer having a value greater than a time to validate stored entries in a centralized database. The time to validate entries in the centralized database can be based on the number of interior gateway protocols (IGPs) configured in the multicast network, among other possibilities. For instance, in some examples a value of the restart timer can be equal to a total of amount of time to send two all host query (AHQ) packets to the number of IGPs configured in the network, among other possibilities.

In some examples, timer engine 132 may set a timer in the standby MM to a value greater than a value of a restart timer in the active MM. For instance, the timer having a value greater than the restart timer may be a group membership timer, a source timer, or both of the group membership timer and the source timer. In some examples, the timer that has a value greater than the restart timer may be an IGMP compatibility timer. Having the value of the timer being great than a value of the restart timer can desirably avoid flooding the network with unnecessary query packets and/or data related to the query packets.

In some examples, the validate engine 136 can send data packets at least to hosts on the network corresponding to the stored entries in the centralized database to maintain service to the hosts while the restart timer is running. For instance, the validate engine 136 can maintain service to hosts included in a centralized database in the active management module and/or in the standby management module, as described herein. In this manner, validate engine 136 can send data packets at least to the hosts on the network corresponding to stored entries in the standby centralized database to avoid a loss of service to the hosts while the restart timer is running.

In some examples, the validate engine 136 can send query packets to validate a host corresponding to an entry of the stored entries in the centralized database in the active management module and/or in the standby management module. For instance, validate engine 136 can send data packets from a standby MM that becomes active at least to hosts on the network corresponding to stored entries in the standby centralized database, as described herein.

In some examples, converge engine 138 can send data packets to a converged group of hosts including at least the validated host (validated by validate engine 136). For instance, in some examples converge engine 136 can responsive to the restart timer expiring, sending data packets to a converged group of hosts including at least the validated host. In this way, the network device can provide service to a converged group including validated entries along with any new joins. Notably, in contrast to other approaches the new joins can be programmed in a line card of the network device 112 substantially at a time of the join request to permit faster delivery of service to the new join as compared to other approaches including host that do not program a line card until expiration of a delay timer. For example, the network device 112 can in some examples receive a query at a standby MM that becomes active while the restart timer is running and, responsive to receipt of the query, can provide data packets while the restart timer is running via the standby MM to a host that sent the query. That is, a converged group can include existing hosts, existing joins, and/or new joins.

In some examples, the instructions can identify whether the network topology of the multicast network is a layer 2 network topology and/or a layer 3 network topology. Subsequent to the identification of the network topology a multicast protocol can be enabled based on the network topology. For example, in response to an identification that the network topology of the multicast network simply includes a layer 2 topology, IGMP snooping on network device 112 can be enabled, IGMP snooping is the mechanism for listening to IGMP network traffic. The mechanism allows network device 112 to listen in on the IGMP conversation between hosts and routers and can promote aspects of centralized database based multicast converging on a network, as described herein.

In some examples, in response to an identification that the network topology of the multicast network includes both a layer 2 topology and a layer 3 topology, PIM protocol can be enabled, in addition to IGMP protocol, on network device 112. In some examples, in response to an identification that the network topology of the multicast network includes a layer 3 topology, both IGMP and PIM protocols can be enabled on network device 112 and can promote aspects of centralized database based multicast converging on a network, as described herein.

Network device 112 may include instructions to determine a network parameter related to the multicast network. Examples of the network parameter may include a number of multicast sources (for example, source system 110) in the multicast network, a number of multicast receivers (for example, hosts 118 and 120) in the multicast network, a number of queriers in the multicast network, network traffic in the multicast network, a number of IGPs configured in the multicast network, packet loss in the multicast network, latency between a queries and a multicast receiver in the multicast network, and presence of a multi-access LAN in the multicast network.

Network device may auto-configure, on network device 112, a multicast parameter related to the multicast protocol based on the network parameter related to the multicast network. For example, in response to a determination that the multicast network includes more multicast sources compared to multicast receivers, a PIM sparse mode of the PIM protocol on network device 112 may be enabled. In sparse mode, a router assumes that no other routers want to receive multicast traffic. In this case, the router closest to the host receives a multicast PIM join message from the receiver device.

In some examples, in response to a determination that the multicast network includes less multicast sources compared to multicast receivers, a PIM dense mode of the PIM protocol on network device 112 may be enabled. PIM dense mode uses dense multicast routing. It implicitly builds shortest-path trees by flooding multicast traffic domain wide, and then pruning back branches of the tree where no receivers are present. In dense mode, a router assumes that all other routers want to receive multicast data for a specific group. If a router receives these packets, and realizes that there may not be any clients for these packets that the router is aware of, the router sends a prune message back to the originating router.

In some examples, a number of IGPs configured in the multicast network can be determined by the network device 112. In response, an assert timer on network device 112 can be auto-configured, for instance, based on the number of IGPs configured in the multicast network, PIM assert messages may be used to determine a forwarder on a network with multiple routers. The forwarder is the router that forwards multicast packets to a network. When an assert message is received, the assert timer may be set to an assert timeout period. The assert timeout period is restarted every time a subsequent assert message for the route entry is received.

In some examples, network device 112 may determine that there are no multi-access LAN in the multicast network. In response, a LAN prune delay option on network device 112 may be disabled.

In some examples, network device may determine an amount of traffic in the multicast network. In response, PIM sparse mode or PIM dense mode on network device 112 may be enabled, based on the amount of traffic in the multicast network. For example, if multicast receivers are present on each LAN, then PIM dense mode may be enabled. In case the number of multicast receivers is less than a pre-defined number, PIM sparse mode may be enabled.

In an example, a parameter related to network device 112 can be determined by the network device. Examples of the parameter related to network device 112 may include a packet processing capability of network device 112, CPU load on network switch, a relative distance of network device 112 from a multicast source as compared to other network devices in the multicast network, and a number of PIM enabled interfaces on network device 112. In response to the determination, a multicast parameter related to the multicast protocol on network device 112 can be determined based on the network parameter related to the multicast network and the parameter related to the network device 112. For example, CPU load and number of PIM enabled interfaces on network device 112 can be determined. In response, the hello interval on network device 112 may be configured. The hello interval specifies the frequency at which hello messages are sent. The hello messages are used to advertise the existence of network device 112. Such hello messaged can be used responsive to a failover to validate entries based on information returned by hosts in response to the hello message. In an example, the protocol parameter may be used for selecting the rendezvous point (RP) router in the multicast network.

In some examples, network device 112 may determine a number of multicast receivers in the multicast network. In response, the IGMP query-interval on network device 112 may be auto-configured based on the number of multicast receivers in the multicast network. In an example deployment of IGMP protocol, a router may periodically broadcast IGMP query messages to determine which multicast addresses are of interest to host systems attached to its network. This router may be called IGMP querier (or querier). Host systems may respond to the query messages by sending IGMP report messages indicating their group memberships. The frequency at which the IGMP querier sends IGMP host-query messages from an interface may be referred to as IGMP "query-interval".

In some examples, if network device 112 was in a query role at a time of a failover the network device 112 can resume querying of the network upon recovery (e.g., when the active management module reactivates). For instance, the network device can resume a querying of the network responsive to a first data packet being sent to the converged group. For instance, network device 112 may send an all host query (AHQ) or other type of query to hosts on the network. In some examples, network device 112 may send an AHQ to each host on the network.

In some examples, network device 112 may determine that the Spanning Tree Protocol (STP), Rapid Spanning Tree Protocol (RSTP), and Multiple Spanning Tree Protocol (MSTP) are configured in the multicast network. In response, a fast-learn feature on network device 112 can be enabled. The fast-learn feature may enable IGMP protocol to quickly converge on topology change and/or responsive to a failover. For instance, the fast-learn feature can be employed to validate stored entries in a centralized database.

In some examples, network device 112 may determine packet loss in the multicast network. In response, a robustness count on network device 112 can be auto-configured based on the packet loss in the multicast network. Robustness count refers to the number of queries network device 112 sends before removing a multicast group from the multicast forwarding table. For instance, in some examples a respective corresponding entry is identified as invalid (due to nonresponse a given number of times greater than a robustness interval), and responsive to identifying as invalid the network device 112 can prune the invalid respective corresponding entry from the active centralized database based on a determination that a protocol does not have a corresponding entry in the active centralized database. Stated differently, validate engine 136 can identify the stored entry in the active centralized database and the respective corresponding host as valid if the respective corresponding host responds to the query packet or can identify the stored entry and the respective corresponding host as invalid if the respective corresponding host does not respond to the query packet.

In some examples, network device 112 can determine a latency between a querier and a multicast receiver in the multicast network. In response, network device may auto-configure last member query interval based on the latency between the querier and the multicast receiver in the multicast network. The "last member query interval" may refer to the interval at which the router sends IGMP group-specific or group-source-specific query messages.

In an example, subsequent to the enablement of a multicast protocol on network device 112 network device may be auto-configured a multicast parameter related to the multicast protocol based on the enabled network topology. For example, in response to an identification that the network topology of the multicast network is a layer 2 topology, IGMP snooping may be enabled on network device 112. In some examples, in response to an identification that the network topology of the multicast network is a layer 3 topology, a querier functionality may be on network device 112. In some examples, in response to an identification that the network topology of the multicast network is a layer 3 topology, IGMP snooping may be disable on network device 112, Disabling IGMP snooping may help in conserving router and ASIC resources.

Figure 2:
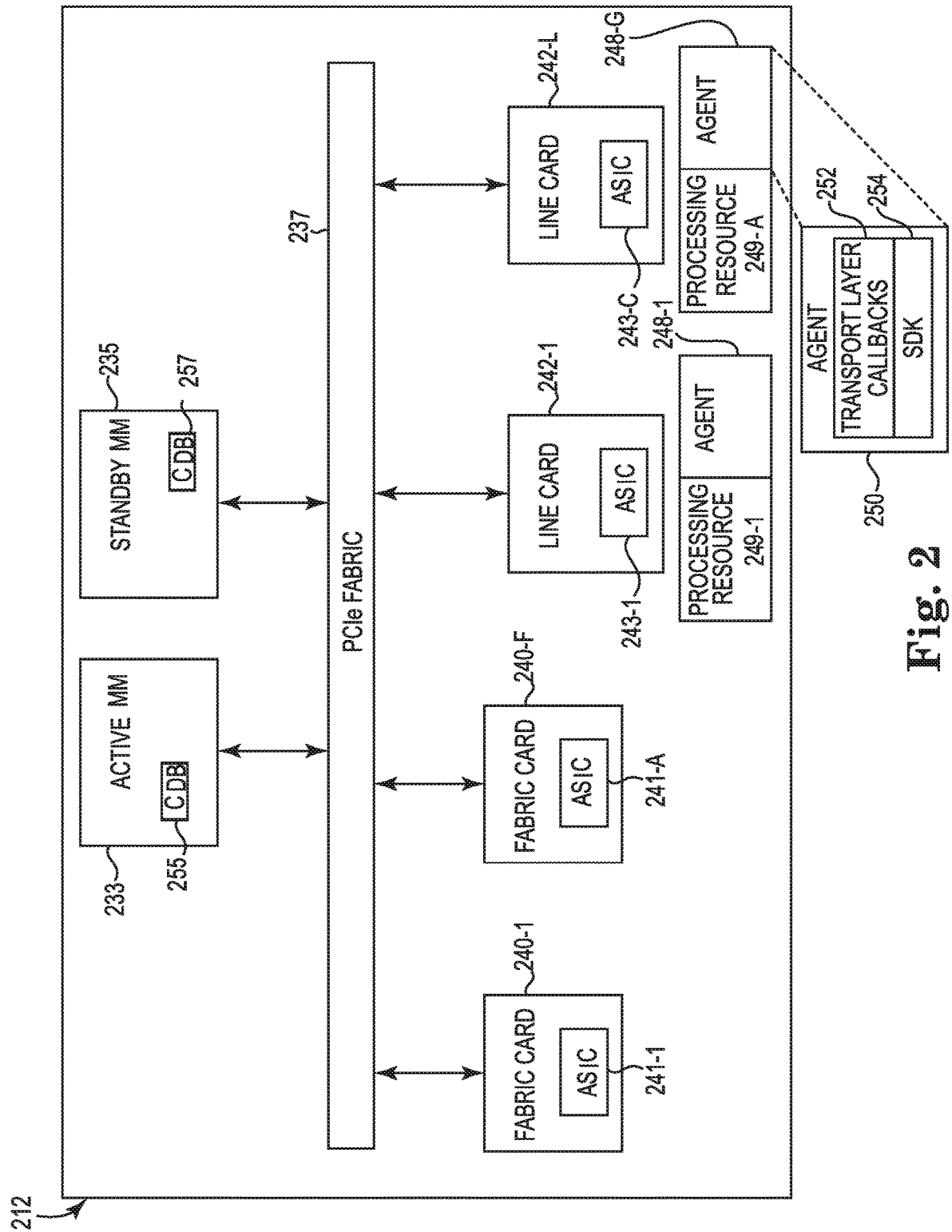
FIG. 2 is a block diagram of an example of a system including a network device suitable with centralized database based multicast converging according to the disclosure.

FIG. 2 is a block diagram of an example of a system including a network device 212 suitable with centralized database based multicast converging according to the disclosure. As illustrated in FIG. 2, network device 212 can include active management module 233, standby management module 235, PCIe fabric 237, first fabric card 240-1, second fabric card 240-F, first fabric ASIC 241-1, second fabric ASIC 241-A, first line card 242-1, second line card 242-L, first line card ASIC 243-1, second line card ASIC 243-C, first remote agent 248-1, second remote agent 248-G, first processing resource 249-1, and a second processing resource 249-A, remote agent 250 including transport layer callbacks 252 and software development kit (SDK) 254, active centralized database 255, and standby centralized database 257.

Active MM 233 can include active centralized database 255. Similarly, standby management module 235 can include standby centralized database 257. Active management module 233 and standby management module 235 can be a combination of hardware and programming to implement the functionalities of the engines described herein. For instance, Active management module 233 and/or standby management module 235 can include engines (e.g., engines 132, 134, 136, and 138) and/or be in communication with engine to implement functionalities of the engines. For example, engines can send data packets to a converged group of hosts from the active MM 233 responsive to the timer expiring but not from the active MM 233 prior to the timer expiring, and can send data packets from standby MM 235 that becomes active at least to the hosts while the restart timer is running, among other possibilities.

Active MM 233 and/or standby MM 235 can be coupled via PCIe fabric 237 or otherwise to first fabric card 240-1 including first fabric ASIC 241-1. Active MM 233 and/or standby MM 235 can be coupled via PCIe fabric 237 or otherwise to second fabric card 240-F including second fabric ASIC 241-A. Similarly, active MM 233 and/or standby MM 235 can be coupled via PCIe fabric 237 or otherwise to first line card 242-1 including first line card ASIC 243-1, second line card 242-L including second line card ASIC 243-C, first remote agent 248-1, second remote agent 248-G, first processing resource 249-1, and a second processing resource 249-A. While FIG. 2 illustrates a given number of components and relative locations of the components, it is understood that a given number and/or position of components can be varied.

Notably, as illustrated in FIG. 2, the network device can be coupled to remote agent 250. Remote agent 250 can include transport layer callbacks 252 and SDK 254 to permit communication between network device (e.g., remote agent 248-G) and the remote agent 250. For instance, the SDK 254 can be used to program an ASIC (such as 241-1, 241-A, 243-1, and/or 243-C) with various instructions such as an API to perform operations including route create, delete, nexthop create/delete, add/delete multicast filters, among other operations. In some examples, SDK 254 can be used to program an ASIC to include IGMP/PIM Replication information, Multicast Filters etc. Such coupling between network device 212 and remote agent 205 can permit updating of the active centralized database (CDB) 255 and/or updating of the standby centralized database 257. Such updating can permit readily accepting new joins without an unwanted delay of other approaches including those that awaiting expiration of the delay timer prior to programming line cards. That is, line cards such as the first line card 242-1 including first line card ASIC 243-1 and/or second line card 242-L including second line card ASIC 243-C can be programmed to include new joins and thereby permit multicast traffic to the new joins before or during validation even in the case of failover, in contrast to other approaches such as those the impart delay by programming line cards following expiration of a delay timer.

Figure 3:
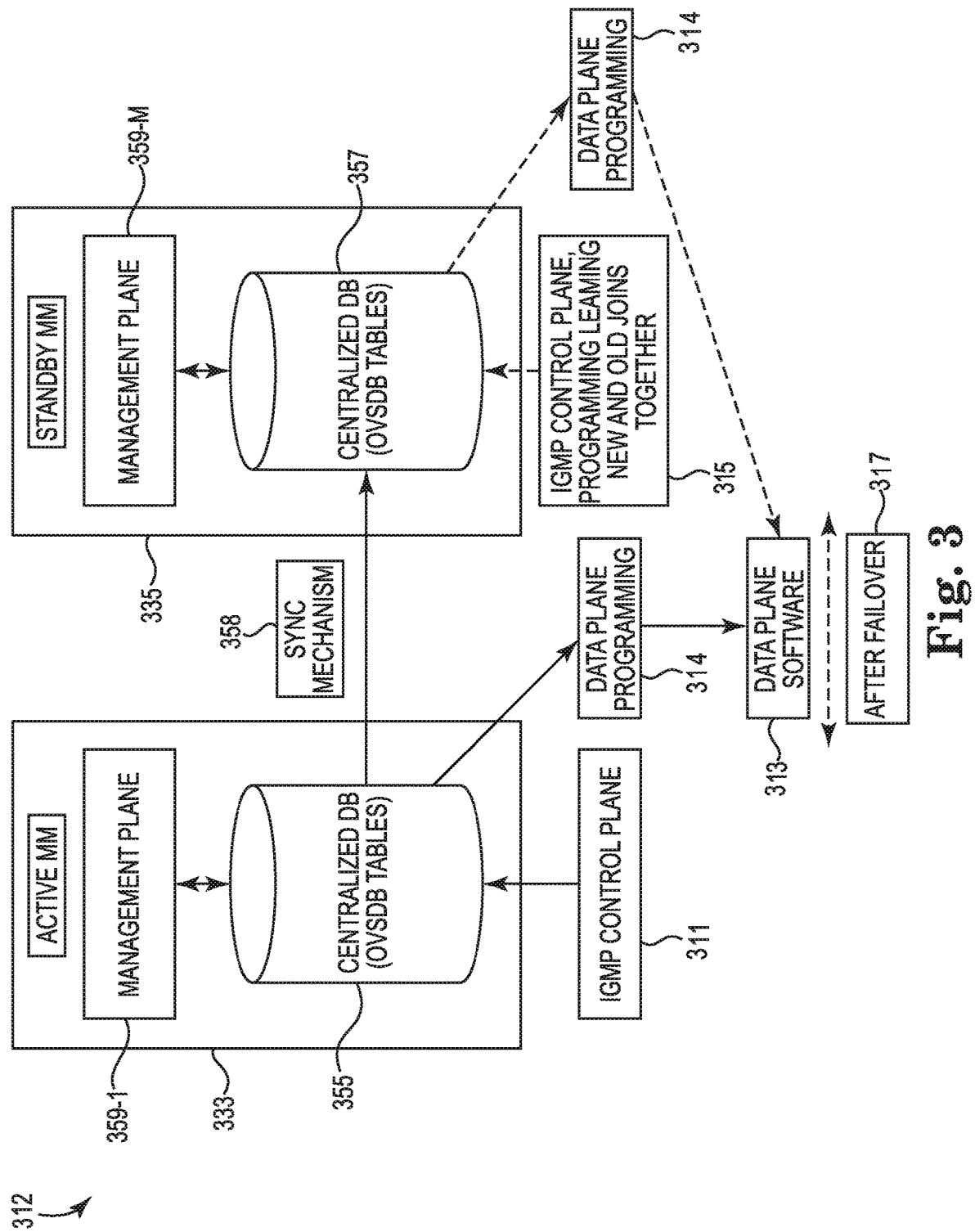
FIG. 3 is a block diagram of an example of a network device suitable with centralized database based multicast converging according to the disclosure.

FIG. 3 is a block diagram of an example of a network device 312 suitable with centralized database based multicast converging according to the disclosure. As illustrated in FIG. 3, the network device can include an active management module 333 including a management plane 359-1 and an active centralized database 355. Similarly, the network device 312 can include a standby module 335 including a management plane 359-M and a standby centralized database 357. Desirably, the management plane (e.g., 359-1 and/or 359-P) can show all of the identified hosts including new and existing joins immediately after a failover, in contrast to other approaches such as those that await expiration of a delay timer and therefore may have a delay in such show capabilities. For instance, responsive to a given CLI command the management plane can show all of the identified hosts.

Active centralized database 355 and/or standby centralized database 357 can be an OVSDB. For instance, both active centralized database 355 and/or standby centralized database 357 may be a respective OVSDB, as illustrated in FIG. 3. In some examples, standby centralized database 357 can be an OVSDB that includes the same information as active centralized database 355 which also is an OVSDB. For instance, in some examples both the standby centralized database 357 and the active centralized database 355 may include the same information, for instance the same PIM or IGMP state information. Having the same PIM or IGMP state information, for instance PIM or IGMP state information of existing joins and/or new joins, can desirably permit uninterrupted service responsive to a failover in contrast to other approaches that may merely cache multicast routing and/or MGID/EPI information from an active table to in a standby table (i.e., those approaches that do not receive PIM and/or IGMP state information but then have to later obtain the same resulting in delay in programming of line cards).

Sync mechanism 358 can refer to hardware, software, and/or firmware to promote syncing of active and standby centralized databases. Sync mechanism 358 can sync configuration and/or run time data (protocols, etc.), among other information to promote aspects of centralized database based multicast routing. For instance, sync mechanism 358 can sync a multicast group learned based on VLAN/port and/or various other dynamic properties of the multicast group.

In some examples, a failover may be a failover of a control plane such as the IGMP control plane 311. After failover (as indicted by 317) various data programming 314 (with regard to the active centralized database 355 and/or the standby centralized database 357) can occur, for instance, based on inputs provided to the data plane software 313. In some examples, data programming can be programming and/or other data plane software that can program information about multicast groups, ports which are to be replicated, etc. from reading a centralized database (such as an OBSDB populated by control plane for programming into an ASIC, for instance by an SDK as described herein.

As mentioned, IGMP control plane programming can learn new joins and old joins, as illustrated at 315. For instance, IGMP control plane programming can lean new joins and old joins while the restart timer is running. Notably, centralized database based multicast converging due to employing the OVSDB the management plane (such as 359-1 and/or 359-M) can desirably permit a 'show' command to display a current operation of an active and/or standby MM. While FIG. 3 illustrates a given number of components and relative locations of the components It is understood that a given number and/or position of components can be varied.

Figure 4:
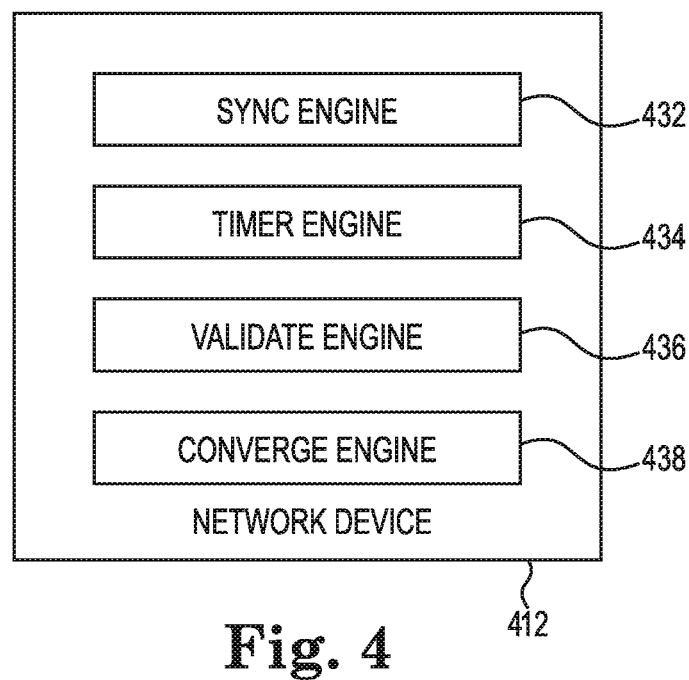
FIG. 4 is another block diagram of an example of a network device suitable with centralized database based multicast converging according to the disclosure.

FIG. 4 is another block diagram of an example of a network device suitable with centralized database based multicast converging according to the disclosure. In an example, network device 412 may be analogous to network device 112 FIG. 1 and network device 212 FIG. 2, in which like reference numerals correspond to the same or similar, though perhaps not identical, components.

Network device 412 may be, for example, a router, a virtual router, a network switch, and a virtual switch. In an example, network device 412 may be a multicast router. Network device 412 may be used to route multicast data from a source system to host (i.e. multicast receivers). In an example, network device 412 may include a sync engine 432, a timer engine 434, a validate engine 436, and a converge engine 438, among other possible engines.

In an example, sync engine 432 can store entries from an active centralized database in active MM to a standby centralized database in a standby MM. Timer engine 434 can set a timer to a value greater than a value of a restart timer and start the restart timer having a value greater than a time to validate entries in the active centralized database. While the restart timer is running, validate engine 436 can send data packets from the standby MM that becomes active at least to hosts on the network corresponding to stored entries in the standby centralized database, and identify entries in the active centralized database as valid or invalid, as described herein. Responsive to the restart timer expiring, converge engine 438 can send data packets from the active MM using the active centralized database to a converged group of hosts.

Figure 5:
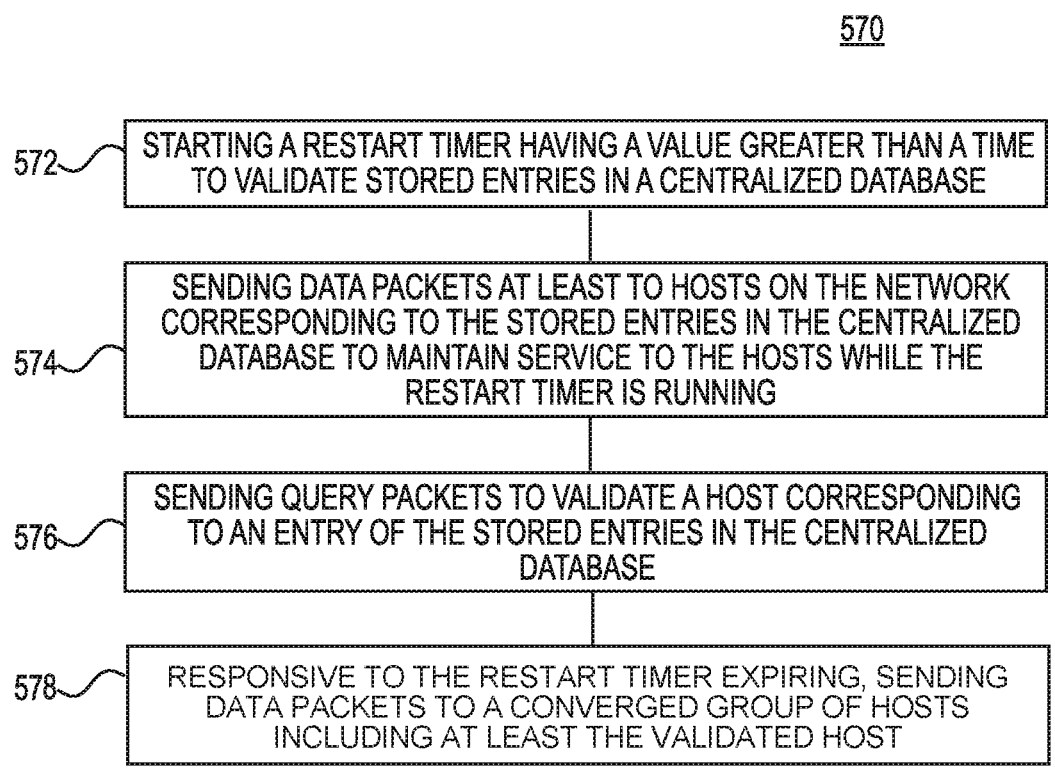
FIG. 5 is a flowchart of an example of a method of centralized database based multicast converging according to the disclosure.

FIG. 5 is a flowchart of an example of a method 570 of centralized database based multicast converging according to the disclosure. The method 570, which is described below, may at least partially be executed on a network device, for example, network device 112 of FIG. 1, network device 212 of FIG. 2 or network device 412 of FIG. 4. However, other computing devices may be used as well. At 572, the method 570 can include starting a restart timer having a value greater than a time to validate stored entries in a centralized database. At 574 the method 570 can include sending data packets at least to hosts on the network corresponding to the stored entries in the centralized database to maintain service to the hosts while the restart timer is running. As mentioned, data packets can be sent to new joins (while restart timer is running) and/or existing joins (identified prior to a failover) while the restart timer is running. At 576 the method 570 can include sending query packets to validate a host corresponding to an entry of the stored entries in the centralized database. At 578 the method 570 can include responsive to the restart timer expiring, sending data packets to a converged group of hosts including at least the validated host.

Figure 6:
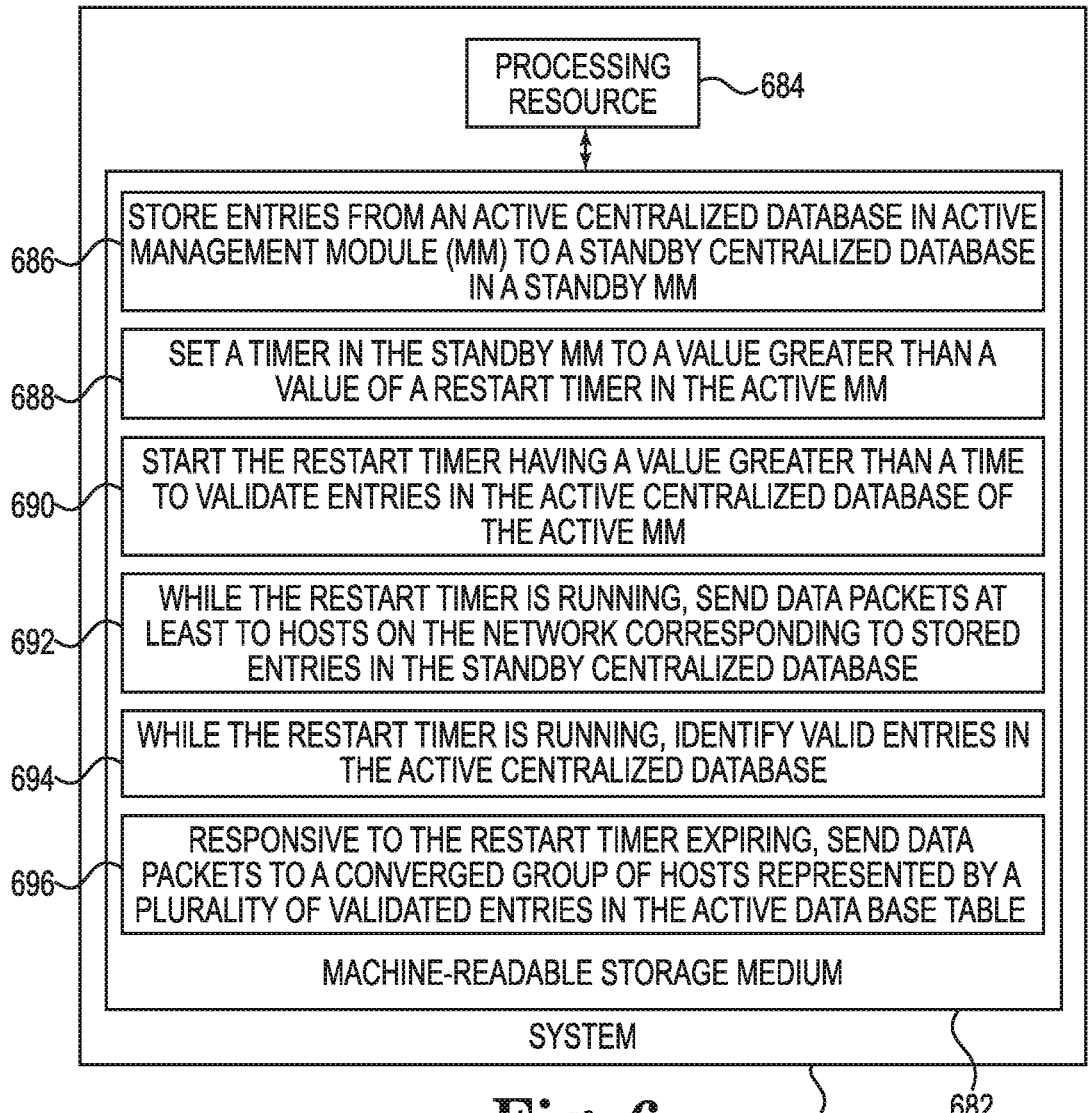
FIG. 6 is a block diagram of an example system including instructions in a machine-readable storage medium for centralized database based multicast converging according to the disclosure.

FIG. 6 is a block diagram of an example system 680 including instructions in a machine-readable storage medium 682 for centralized database based multicast converging according to the disclosure. System 682 includes a processing resource 684 and a machine-readable storage medium 682 communicatively coupled through a system bus. In an example, system 680 may be analogous to network device 112 of FIG. 1, network device 212 of FIG. 2, or network device 412 of FIG. 4. Processing resource 684 may be any type of Central Processing Unit (CPU), microprocessing resource, or processing logic that interprets and executes machine-readable instructions stored in machine-readable storage medium 682. Machine-readable storage medium 682 may be a random access memory (RAM) or another type of dynamic storage device that may store information and machine-readable instructions that may be executed by processing resource 684. For example, machine-readable storage medium 682 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 682 may be a non-transitory machine-readable medium. Machine-readable storage medium 682 may store instructions 686, 688, 690, 692, 694, 696. In an example, instructions 686 may be executed by processing resource 684 to store entries from an active centralized database in active MM to a standby centralized database in a standby MM. Instructions 688 may be executed by processing resource 684 to set a timer in the standby MM to a value greater than a value of a restart timer in the active MM. Instructions 690 may be executed by processing resource 684 to, start the restart timer having a value greater than a time to validate entries in the active centralized database of the active MM. Instructions 692 may be executed by processing resource 684 to, while the restart timer is running, send data packets at least to hosts on the network corresponding to stored entries in the standby centralized database. Instructions 694 may be executed by processing resource 684 to while the restart timer is running, identify valid entries in the active centralized database. Instructions 696 may be executed by processing resource 684 to responsive to the restart timer expiring, send data packets to a converged group of hosts represented by a plurality of validated entries in the active data base table.

For the purpose of simplicity of explanation, the example method of FIG. 5 is shown as executing serially, however it is to be understood and appreciated that the present and other examples are not limited by the illustrated order. The example systems herein may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processing resource.

It should be noted that the above-described examples of the present solution are for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

What is claimed is:

1. A method of centralized database based multicast converging on a network, comprising:
   starting a restart timer having a value greater than a time to validate stored entries in a centralized database;
   sending a first plurality of data packets at least to hosts on the network corresponding to the stored entries in the centralized database to maintain service to the hosts while the restart timer is running;
   sending query packets to validate a host corresponding to an entry of the stored entries in the centralized database; and
   responsive to the restart timer expiring, sending a second plurality of data packets to a converged group of hosts including at least the validated host.

2. The method of claim 1, further comprising setting a timer to a value greater than a value of the restart timer.

3. The method of claim 2, wherein the timer is a group membership timer, a source timer, or both of the group membership timer and the source timer.

4. The method of claim 2, wherein the timer is an Internet Group Management Protocol (IGMP) compatibility timer.

5. The method of claim 2, further comprising sending the first plurality of data packets to the converged group of hosts from an active management module (MM) responsive to the timer expiring but not from the active MM prior to the timer expiring, and further comprising sending the second plurality of data packets from a standby MM that becomes active at least to the hosts while the restart timer is running.

6. The method of claim 1, further comprising:
receiving a query at a standby management module (MM) that becomes active while the restart timer is running, and
responsive to receipt of the query, providing the first plurality of data packets while the restart timer is running via the standby MM to a host that sent the query.

7. The method of claim 1, wherein protocol stored in centralized database of a standby management module (MM) at a time of a failover are maintained but not used by the standby MM when the standby module becomes active to avoid flooding the network.

8. A multicast converging network device comprising:
a memory storing non-transitory machine-readable media including instructions executable by a processing resource to:
store entries from an active centralized database in active management module (MM) to a standby centralized database in a standby MM;
set a timer in the standby MM to a value greater than a value of a restart timer in the active MM;
start the restart timer having a value greater than a time to validate entries in the active centralized database of the active MM;
while the restart timer is running, send a first plurality of data packets at least to hosts on the network corresponding to stored entries in the standby centralized database; and
while the restart timer is running, identify valid entries in the active centralized database; and
responsive to the restart timer expiring, send a second plurality of data packets to a converged group of hosts represented by a plurality of validated entries in the active data base table.

9. The multicast converging network device of claim 8, wherein the multicast converging network device further comprises a first hop multicast converging device of the network.

10. The multicast converging network device of claim 9, wherein the multicast converging network device further comprises a switch, wherein the switch is enabled for both Internet Group Management Protocol (IGMP) and Protocol Independent Multicast (PIM) protocol, and wherein the switch is enabled for IGMP snooping.

11. The multicast converging network device of claim 10, wherein the active centralized database further comprises an Open virtual Switch database (OVSDB), and wherein the standby centralized database further comprises a OVSDB that include the same information as the active centralized database, wherein the same information includes PIM or IGMP state information of existing or new joins.

12. The multicast converging network device of claim 9, wherein the multicast converging network device further comprise a router, wherein the router is capable of employing an Open virtual Switch database (OVSDB).

13. The multicast converging network device of claim 9, wherein the multicast converging network device was in a query role at a time of a failover, and wherein the instructions further comprise instructions to resume querying of the network responsive to a first data packet being sent to the converged group.

14. The multicast converging network device of claim 13, wherein the instructions further comprise instructions to send an all host query (AHQ) message to each host of a plurality of hosts on the network.

15. A non-transitory computer readable medium having stored thereon non-transitory machine readable instructions for centralized database based multicast routing, the instructions responsive to a failover to:
store entries from an active centralized database in active management module (MM) to a standby centralized database in a standby MM;
set a timer to a value greater than a value of a restart timer;
start the restart timer having a value greater than a time to validate entries in the active centralized database;
while the restart timer is running:
send a first plurality of data packets from the standby MM that becomes active at least to hosts on the network corresponding to stored entries in the standby centralized database; and
identify entries in the active centralized database as valid or invalid; and
responsive to the restart timer expiring, send a second plurality of data packets from the active MM using the active centralized database to a converged group of hosts.

16. The medium of claim 15, wherein the failover is a control plane failover.

17. The medium of claim 15, wherein the instructions to identify entries as valid or invalid further comprise instructions to:
send a query packet to a respective host corresponding a stored entry of the stored entries in the active database; and
identify the stored entry in the active centralized database and the respective corresponding host as valid if the respective corresponding host responds to the query packet; or
identify the stored entry and the respective corresponding host as invalid if the respective corresponding host does not respond to the query packet.

18. The medium of claim 17, wherein the respective corresponding entry is identified as invalid, and further comprising instructions to prune the invalid respective corresponding entry from the active centralized database.

19. The medium of claim 15, wherein the value of the restart timer is equal to a total of amount of time to send two all host query (AHQ) packets.

20. The medium of claim 15, wherein the instructions further comprise instructions to send the first plurality of data packets at least to the hosts on the network corresponding to stored entries in the standby centralized database to avoid a loss of service to the hosts while the restart timer is running.

* * * * *